C. F. SCOVILLE
Truck for Moving Mounted Car Wheels

No. 117337      Patented Jul 25 1871

Witnesses:
H. F. Eberts
Julius Wilcke

Inventor:
Charles F. Scoville,
per Attorney,
Thos. S. Sprague

UNITED STATES PATENT OFFICE.

CHARLES F. SCOVILLE, OF CHICAGO, ILLINOIS.

IMPROVEMENT IN TRUCKS FOR MOVING MOUNTED CAR AXLES.

Specification forming part of Letters Patent No. 117,337, dated July 25, 1871.

*To all whom it may concern:*

Be it known that I, CHARLES F. SCOVILLE, of Chicago, in the county of Cook and State of Illinois, have invented a new and useful Improvement in a Truck for Moving Mounted Car-Wheels; and I do declare that the following is a true and accurate description thereof, reference being had to the accompanying drawing and to the letters of reference marked thereon, and being a part of this specification, in which—

Figure 1:
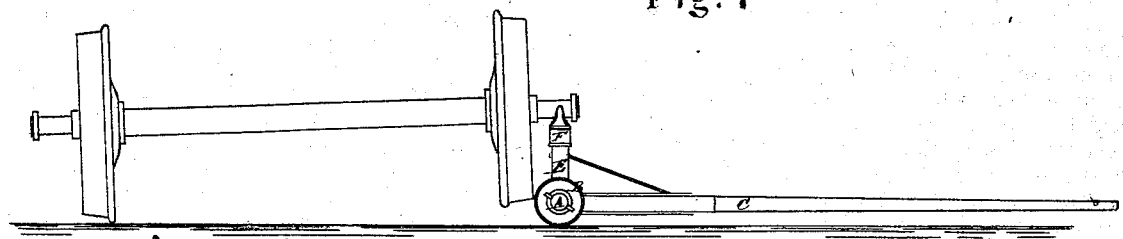
Figure 2:
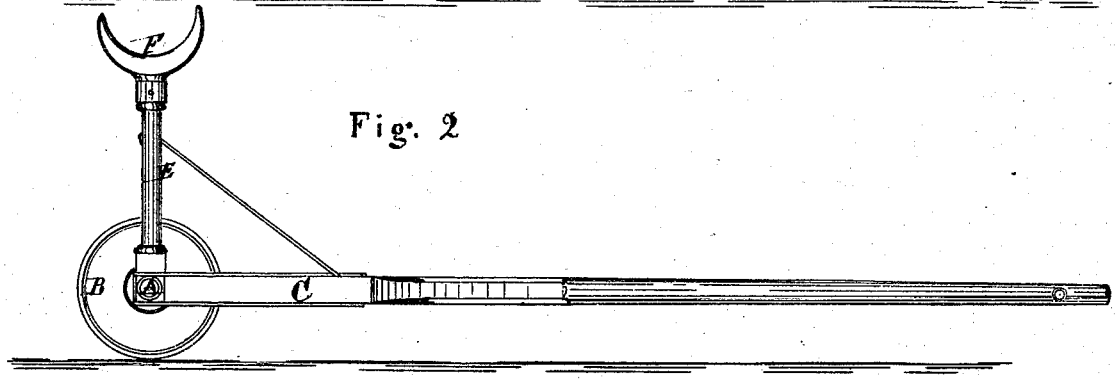
Figure 3:
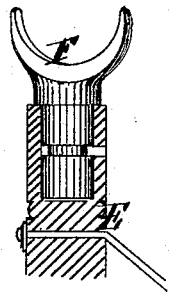
Figure 4:
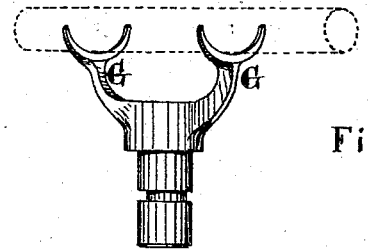

Figure 1 shows, in elevation, my device as when used for turning around a pair of mounted wheels. Fig. 2 is a side elevation of my truck partly in section. Fig. 3 is an enlarged section of the rotating head, and Fig. 4 is a perspective view of the axle-carrier head.

Like letters refer to like parts in each figure.

This invention relates to a truck by means of which a pair of car-wheels mounted on their axle may be readily turned around or moved about with two men, instead of requiring five or six, as is necessary, without it; and it consists in the novel and peculiar construction of a standard and rotary head or heads for supporting the axle, and their arrangement on a two-wheeled truck provided with a tongue, as more fully hereinafter set forth.

In the drawing, A represents a short axle, carrying at each end a small traction-wheel, B, and having attached thereto a tongue or draft-pole, C. E is a standard rising from the center of the axle and securely braced. F is a crescent-shaped metallic head, rotating freely on top of the standard, and forms the axle-support at the journal thereof. The socket of the head may be provided with any suitable device for preventing its detachment from the standard. In railway repair-shops it frequently becomes necessary to move or turn around an axle having the wheels mounted thereon. As these weigh about one thousand four hundred pounds, and in turning require to be lifted bodily, the services of five or six men are necessary to accomplish it. With my truck not more than two men are employed, who tilt up the tongue of the truck to bring the head F under the journal of the axle behind the collar, and by bearing down on the tongue the wheel will be lifted from the ground, when that end of the axle may be swung around on the flange of the other wheel as a pivot; or if it be desired to move the wheels laterally, or on the prolongation of the axle, a similar truck is placed under the other journal of the axle, when the whole may be drawn about in any direction by two men. To swing the axle and wheels around within the length of the axle, and to use but a single truck for transporting them, I use a differently-shaped head, swiveled on the standard, as shown in Fig. 4, being a pair of arms laterally projecting from a central socket, with the crescent-shaped axle-support rising from the upward-curved ends of the arms. The socket is swiveled on the standard in any convenient manner, like the single head above described, and both are interchangeable thereon. The axle is supported under the middle by the double supports G, to clear the wheels from the ground, when the whole may be turned around on its axis, which is the standard E, or moved about, as may be required.

I am aware that the head may be made stationary on the standard or form part thereof, but such an arrangement does not exhibit the convenience of the rotating head. I do not intend to limit myself to the rotating head or heads above described.

What I claim as my invention, and desire to secure by Letters Patent, is—

The single axle-supporting head F or double one G, rotating on the standard E of a two-wheeled truck, substantially as herein described, for the purpose specified.

CHAS. F. SCOVILLE.

Witnesses:
   H. F. EBERTS,
   JULIUS WELCKE.